(12) United States Patent
Lebon et al.

(10) Patent No.: US 12,410,778 B2
(45) Date of Patent: Sep. 9, 2025

(54) METHOD FOR ASSEMBLING A FLOATING STRUCTURE FOR SUPPORTING A WIND TURBINE

(71) Applicant: SOLETANCHE FREYSSINET, Rueil-Malmaison (FR)

(72) Inventors: Jean-Daniel Lebon, Saint-Germain-en-Laye (FR); Benoit Donnezan, Ensues la Redonne (FR); Jean-Philippe Ricard, L'Etang la Ville (FR)

(73) Assignee: SOLETANCHE FREYSSINET (FR)

( * ) Notice: Subject to any disclaimer, the term of this patent is extended or adjusted under 35 U.S.C. 154(b) by 334 days.

(21) Appl. No.: 17/951,401

(22) Filed: Sep. 23, 2022

(65) Prior Publication Data

US 2023/0099223 A1   Mar. 30, 2023

(30) Foreign Application Priority Data

Sep. 24, 2021   (EP) ..................................... 21306323

(51) Int. Cl.
*F03D 13/25* (2016.01)
*B63B 35/44* (2006.01)
*F03D 13/10* (2016.01)

(52) U.S. Cl.
CPC .............. *F03D 13/25* (2016.05); *B63B 35/44* (2013.01); *F03D 13/10* (2016.05); *B63B 2035/446* (2013.01); *F05B 2230/6102* (2013.01)

(58) Field of Classification Search
CPC ..... B63B 5/18; B63B 35/44; B63B 2035/446; B63B 73/46; B63B 73/49; B63B 2035/4433; B63B 73/10; B63B 73/30; B63B 75/00; B63B 77/10; F03D 13/10; F03D 13/25; F03D 2230/6102; Y02E 10/727

USPC ................................. 114/264, 265, 266, 267
See application file for complete search history.

(56) References Cited

U.S. PATENT DOCUMENTS

| 9,394,035 | B2 | 7/2016 | Dagher et al. |
| 9,574,550 | B2 * | 2/2017 | Fyfe ...................... E02D 27/425 |
| 10,215,161 | B2 | 2/2019 | Viselli et al. |

FOREIGN PATENT DOCUMENTS

| FR | 2999245 A1 | 6/2014 |
| WO | 2013155521 A1 | 10/2013 |
| WO | 2015120229 A1 | 8/2015 |

OTHER PUBLICATIONS

European Search Report (EPSR) for EP 21306323 dated Mar. 14, 2022 (3 pages).

* cited by examiner

*Primary Examiner* — Daniel V Venne
(74) *Attorney, Agent, or Firm* — Jason A. Smith; Shumaker, Loop & Kendrick, LLP (57) ABSTRACT

A method for constructing a wind turbine concrete floater including a central connector from which radial arms extend, the central connector carrying a central stability tower, and each arm carrying an outer stability tower. The method includes prefabricating the arms, central connector and at least parts of the stability towers, pre-assembling the central connector with one arm to form a primary pre-assembly, mounting temporary flotation devices onto the arms to provide additional buoyancy to them, floating the primary preassembly and floating the other arms of the floater, and assembling offshore said primary preassembly with said other arms.

14 Claims, 11 Drawing Sheets

METHOD FOR ASSEMBLING A FLOATING STRUCTURE FOR SUPPORTING A WIND TURBINE

BACKGROUND

Floating offshore platforms for supporting wind turbines are currently attracting a lot of interest worldwide and their use is forecast to grow in the coming years.

The invention more particularly relates to concrete offshore platforms having volumes to provide buoyancy divided in a plurality of arms (e.g. three arms) extending radially from a central connector and each carrying an outer stability tower (also called stability column or pillar) near its distal end. The central connector carries a central stability tower on which a mast of the wind turbine is fixed. The platform is typically connected to anchors in the seabed by chains or cables.

It is known to assemble the platform on shore on a dry dock with only the base part of the towers being present on the arms. After assembly, the dry dock is flooded, and the platform can be towed away. The remaining parts of the towers can be mounted on the platform while the latter is moored to a quayside near the dry dock. Alternatively the towers can be fully constructed in the dry dock. A drawback of such method is the need of large dock areas for carrying the assembly of the platform.

U.S. Pat. No. 9,394,035 discloses a semisubmersible wind turbine platform capable of floating on a body of water and supporting a wind turbine over a vertical center column. The platform includes three or more vertical outer columns spaced radially from the center column, each of the outer columns being connected to the center column with one or more of bottom beams, top beams, and struts, with the major structural components being made of concrete and having sufficient buoyancy to support the wind turbine tower.

U.S. Ser. No. 10/215,161 discloses a method of constructing and assembling onshore a floating wind turbine platform which includes constructing pre-stressed concrete sections of a floating wind turbine platform base, assembling the floating wind turbine platform base sections to form the base at a first location in a floating wind turbine platform assembly area, and moving the base to a second location in the floating wind turbine platform assembly area. Pre-stressed concrete sections of floating wind turbine platform columns are constructed, and the column sections are assembled to form a center column and a plurality of outer columns on the base to define a hull at the second location in the floating wind turbine platform assembly area. The hull is then moved to a third location in the floating wind turbine platform assembly area. Secondary structures are mounted on and within the hull, and the hull is moved to a fourth location in the floating wind turbine platform assembly area. A wind turbine tower is constructed on the center column, and a wind turbine is mounted on the wind turbine tower, thus defining the floating wind turbine platform. The floating wind turbine platform is then moved to a launch platform in a fifth location and launched into a body of water. A launch barge may be used to launch the base, the hull, or any other portion of the floating wind turbine platform. When the base, the hull, or a portion of the floating wind turbine platform is launched prior to completion of the floating wind turbine platform, the remaining components may be assembled while the base, the hull, or a portion of the floating wind turbine platform is floating in the body of water adjacent to the dock, the shoreline, a pier, or other structure. A drawback of such method is also the need of large dock areas for carrying the assembly of the platform.

WO 2013155521 discloses a method of assembling a floating wind turbine platform comprising assembling at least three platform wings onto two or more floatation devices made of barges on a body of water, the platform wings having a bottom beam and at least a base portion of an outer or center column, with each floatation device supporting one or more platform wings; bringing the barges together arranged about a bottom keystone; attaching each of the platform wings to the bottom keystone to form the lower portion of a foundation for a wind turbine platform, with the outer columns spaced radially from the bottom keystone, and the outer columns equally circumferentially spaced about the bottom keystone; removing the floatation devices from under the platform wings such that the foundation floats in the body of water to form a floating wind turbine platform, thereby allowing further construction of the platform in the water.

SUMMARY

There remains a need for enabling the construction of wind turbine concrete floaters in a cost-effective way and with possible limited dock area to enable an easier deployment in most territories worldwide.

The present invention aims at satisfying this need.

Exemplary embodiments of the invention relate to a method for constructing a wind turbine concrete floater comprising a central connector from which radial arms extend, the central connector carrying a central stability tower, and each arm carrying an outer stability tower, the method comprising:
  Prefabricating the arms, central connector and at least parts of the stability towers,
  Pre-assembling the central connector with one arm to form a primary pre-assembly,
  Mounting temporary flotation devices onto the arms to provide additional buoyancy to them if necessary,
  Floating the primary preassembly and floating the other arms of the floater,
  Assembling offshore said primary preassembly with said other arms.

The prefabricating of the arms, central connector and at least parts of the stability towers can occur on shore, in particular on a quay or in a dry dock, or on a floating barge; small dry-docks could be used for the pre-fabrication of each arm.

Pre-assembling the central connector with one arm to form a primary pre-assembly can occur on shore, in particular on a quay or in a dry dock, or on a floating barge.

The invention eases the constraints on the port facilities and enables easier deployment of the floaters, without having to first build large and costly dedicated port facilities.

During the assembly of the primary preassembly and the other arms, the arms are immerged at least partially in the water; the temporary flotation devices enable to adjust more easily the orientation of the arms relative to the primary preassembly during their assembly.

The invention allows to:
  (1) split the floater structure into smaller components cast on-shore that will be easier to store and load-out,
  (2) load-out the components using smaller load-out areas and means, and
  (3) assemble the components at sea to form the complete floater.

The floater may comprise three or four arms, or more.

The central connector is a part eventually submerged to which the arms are centrally connected and that supports the central stability tower onto which a turbine mast is resting.

Each outer stability tower is eventually partly submerged and resting on the end of the corresponding arm.

Each temporary flotation device is different from a barge and extends along the corresponding arm on a distance less than the length of the arm. The temporary flotation device may be mounted in an adjustable manner on the corresponding arm to provide trim. The temporary flotation device does not prevent the arm to be at least partially immerged and the buoyancy of the primary preassembly is due at least in part to the buoyancy of the arm thereof.

The method may comprise adjusting the position of each temporary flotation device axially relative to the arm to make the longitudinal axis of the arm horizontal.

Each temporary flotation device may be substantially of a U-shape in cross section, with two legs extending downward on either side of the arm and an upper base resting on the arm. The method may comprise assembling parts of the temporary flotation device offshore over and/or onto the corresponding arm. The flotation device may comprise two symmetrical buoyant parts that are assembled over the arm offshore.

The method comprises removing the temporary flotation device after assembly; such removal may take place after assembly of the other arms to the connector. Each flotation device may comprise two retractable retaining corbels extending under the arm that are retracted to allow removal of the device.

The method may comprise assembling on shore each arm with a corresponding outer stability tower or a part thereof.

The method may comprise assembling on shore the central stability tower or a part thereof on the corresponding arm. The primary preassembly may thus comprise when it is loaded out not only the central connector and a corresponding arm, but also the central stability tower and the corresponding outer stability tower.

The method may comprise providing a protection fender system between the primary preassembly and the other arms to avoid shocks between them during the assembly of each other arm to the central connector; the protection fender system may be progressively disarmed until concrete-to-concrete contact is obtained between the central connector and each other arm. The protection fender may comprise an inflatable fender. In such case, the disarming of the fender corresponds to disinflation of the fender.

The method may comprise water ballasting the arms to adjust the arms at a same level before assembly. There may also be a water ballasting of the flotation device, and a combination of the water ballasting of the arm and associated flotation The method may comprise approaching the other arms to the central connector using a pulling system such as pulling cables and guiding devices.

The method may comprise activating a temporary clamping system keeping the other arms in fixed relationship to the central connector while the other arms are assembled to the central connector.

The assembly of the other arms to the central connector may comprise:
  Activation of inflatable joints between the central connector and at least one of the other arms to create a chamber at the junction,
  Pumping water out of the chamber,
  Reinstating post-tensioning ducts connections in recesses formed during onshore construction,
  Pouring non-shrink mortar in the recesses,
  Post-tensioning tendons threaded in said ducts.

The method may comprise after completion of the assembly of the other arms to the primary preassembly, installation of a wind turbine mast, nacelle and blades.

Exemplary embodiments of the invention also relate to a system for performing the method above, comprising:
  A concrete floater (also called platform) comprising at least three radial arms fixed to a central connector,
  Additional flotation devices each configured to be mounted on a corresponding arm and serving to provide additional buoyancy during offshore assembly of at least two arms to a primary preassembly made of another arm with a central connector.

Each additional flotation device (also called additional buoyancy device) may comprise two symmetrical parts that are assembled along a midplane of the device. The flotation device may comprise two legs and an upper base connecting the legs. Each leg may be provided with a retractable retaining corbel. The upper base may comprise a steel structure.

Exemplary embodiment of the invention also relates to the additional flotation device per se, preferably such as defined above, comprising two legs connected by an upper base, and with retractable corbels.

DETAILED DESCRIPTION

Figure 1:
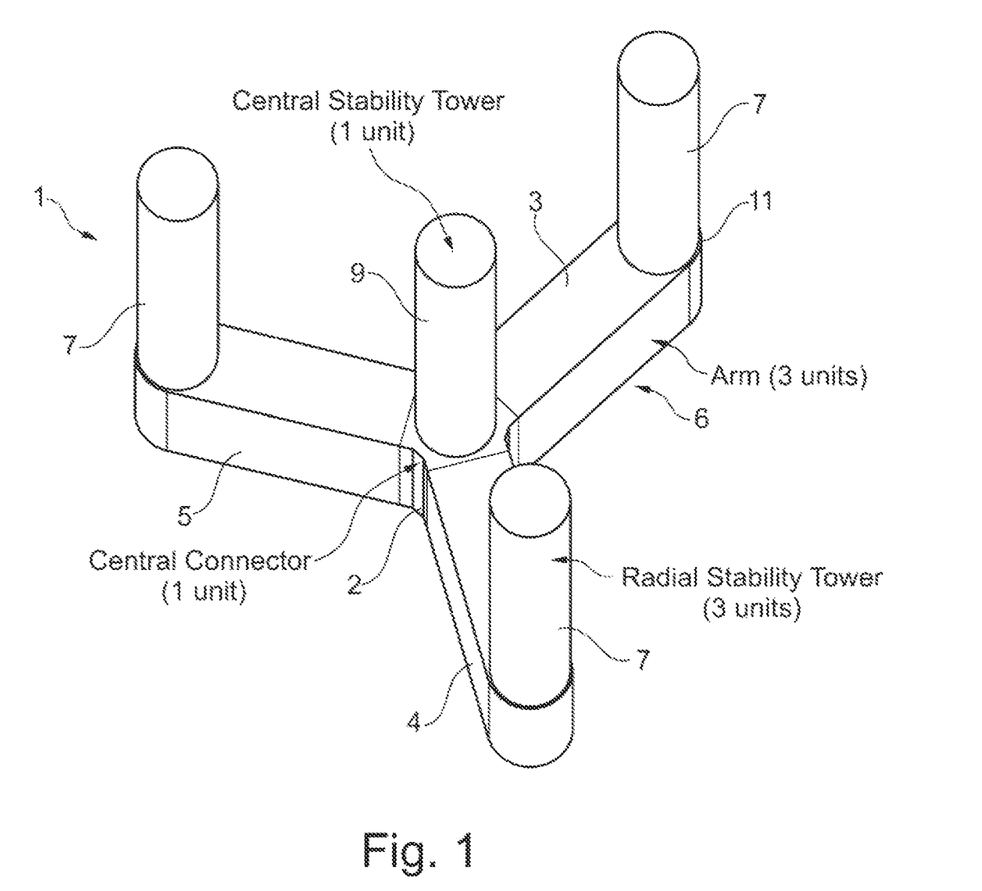
FIG. 1 is a partial and schematic perspective view of an exemplary embodiment of a floating structure in accordance with the invention.

FIG. 1 shows a floater 1 made in accordance with the invention.

The floater 1 is shown before the wind turbine mast, nacelle and blades are assembled thereon.

The floater 1 comprises a central connector 2 to which three arms 3, 4 and 5 are attached.

The arms extend radially outward from the connector 2.

The arms 3, 4 and 5 are hollow and can be water ballasted. Diaphragm walls (not shown) may be inserted inside the hollow structure of each arm, for trim and/or heel ballasting.

Though the floater shown has three arms, the invention applies to floaters having more arms, for example four arms.

The arms 3, 4 and 5 are arranged in a star configuration, and their longitudinal axes extend at 120° from each other.

The three arms 3, 4 and 5 together with the central connector 2 form a platform 6 that supports outer stability towers 7.

The central connector 2 carries a central stability tower 9. This central stability tower 9 is also configured for supporting the mast (not shown) of the wind generator.

These towers 7 and 9 are intended to be submerged only partially (for stability of the full floating structure) and provide stability to the platform 6. The arms are designed to be fully submerged but may be partially submerged only when under construction or assembly.

Each outer stability tower 7 is situated near the distal end 11 of the corresponding arm.

In the example shown, the outer stability towers 7 are interconnected only via the arms 3, 4 and 5 and connector 2, and the floater comprises no strut connecting the outer towers 7 to the central tower 9. However, in variants (not shown), the floater may comprise additional means connecting the outer towers 7 to the central tower 9 and/or the outer towers 7 together.

The platform 6 is made of reinforced post-tensioned concrete. The stability towers 7 and 9 are preferably made of reinforced post-tensioned concrete, but in variants are made of steel boxes, to meet stability constraints for example.

In accordance with the invention, parts of the floater 1 are made on shore and assembled offshore.

The onshore prefabrication activities are preferably as follows:

Construction of the arms 3, 4, and 5 at dedicated stations.

The arms can be identical and built as a cast in-situ single piece or as an assembly of precast sections, joined using either cast in-situ reinforced concrete stitches or temporary post-tensioning over match-cast epoxy glued joints. To ensure perfect contact during assembly, the end of each arm that will be connected to the central connector 2 may either be match-cast with the central connector 2 or incorporate a match-cast section.

Figure 11:
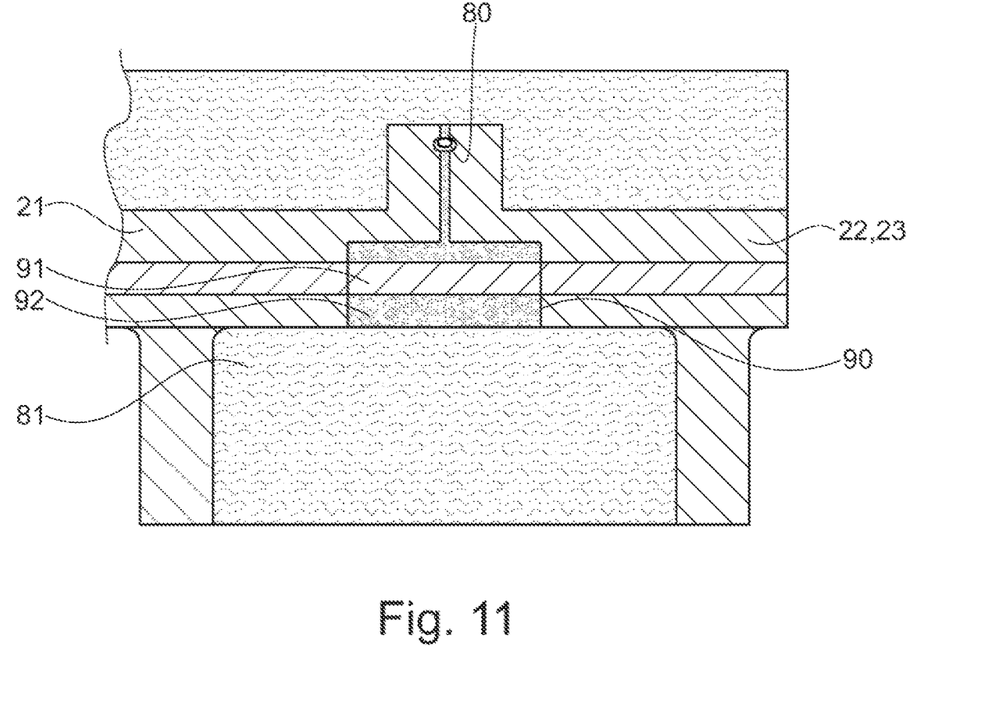
FIG. 11 is a partial and schematic view in section of the interface between the connector and secondary arm.

Construction of central connectors 2 at dedicated stations. Each face 12 of the central connector 2 intended to be in contact with a corresponding face 13 of an arm 3, 4 or 5 may incorporate a precast match-cast section in case the arms are not match-cast against these faces. The central connector and/or the arms may comprise short match cast sections with either plain rubber joint or inflatable joint to be injected with cementitious grout; FIG. 11 described below shows an example of such joint 80.

Construction of outer stability towers 7 and central stability tower 9 in the form of precast rings or half rings reassembled using post-tensioning or cast in situ with sliding formwork.

The central connectors 2 and arms 3, 4 and 5 are provided with ducts (not shown) for inserting tendons that will be post-tensioned after assembly of the platform 6.

Figure 2:
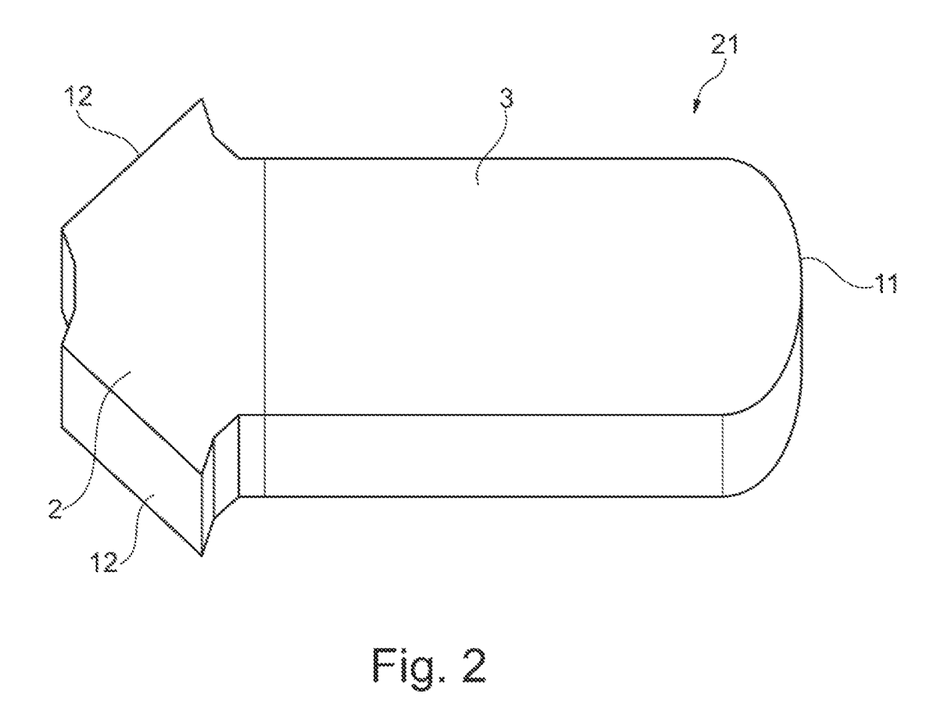
FIG. 2 shows in isolation the main arm of the structure.

The onshore assembly sequences are preferably as follows:

Transfer of one arm (for example the arm 3 as shown) and the central connector 2 to an assembly station and connection of the two using possibly temporary post-tensioning. Such a primary preassembly 21 of the arm 3 and central connector 2 is shown in isolation in FIG. 2.

Figure 3:
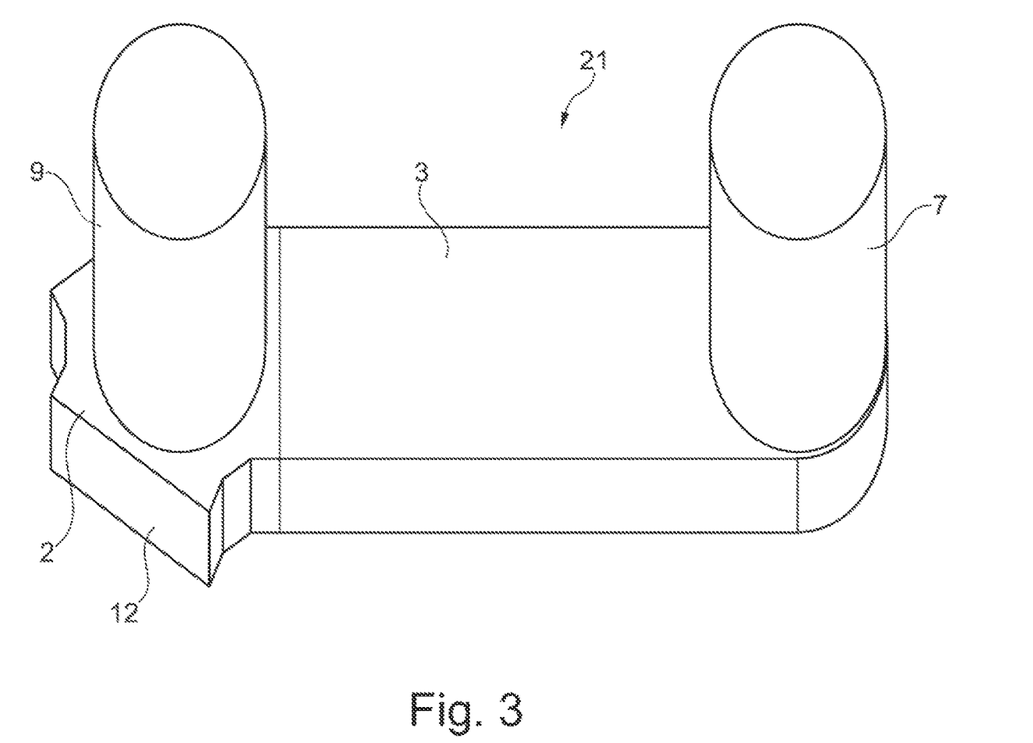
FIG. 3 shows the arm of FIG. 2 after assembling the towers on the main arm.

Transfer of the components forming the central stability tower 9 and a corresponding outer stability tower 7 to the assembly station and assembly of the tower 9 onto the arm 3 and connector 2 of the primary preassembly 21, as shown in FIG. 3. The central and/or outer stability towers can also be cast in situ with using sliding formwork. In a variant, stability towers are assembled to the corresponding arms after load-out and float-off of the arms.

Figure 4:
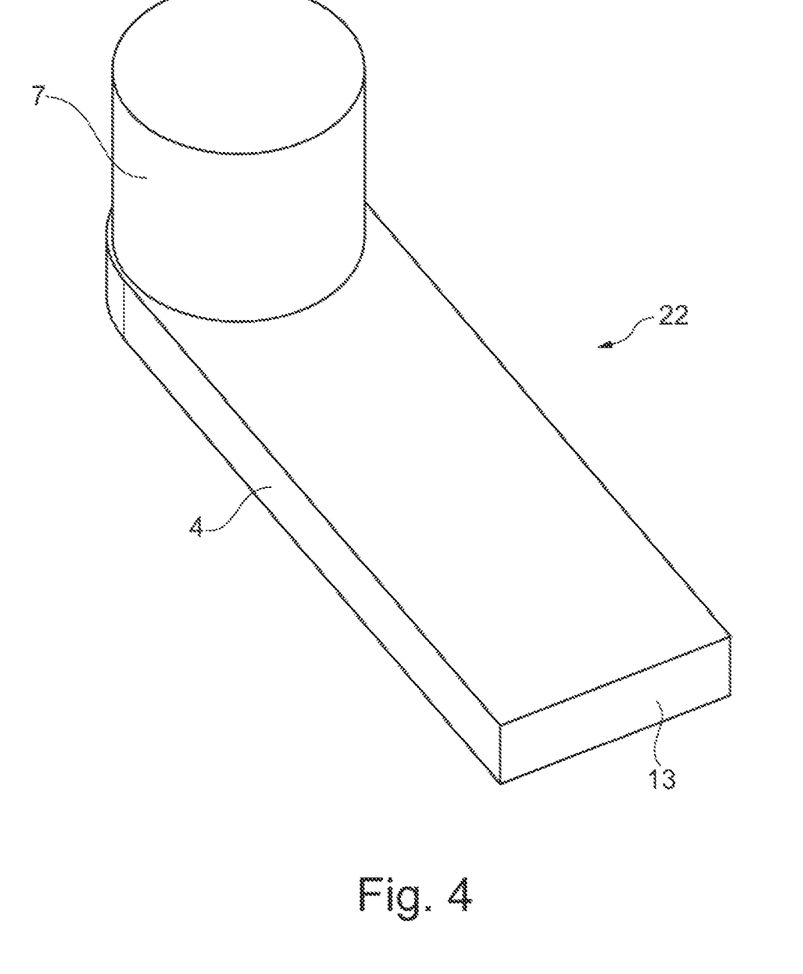
FIG. 4 shows in isolation one of the secondary arms.
Figure 5:
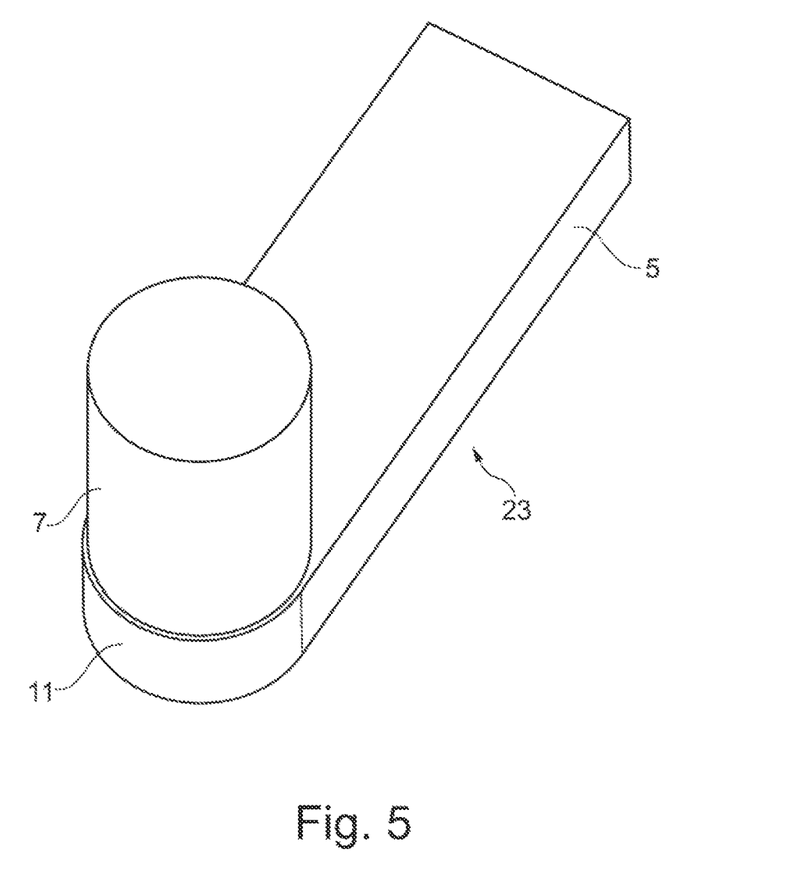
FIG. 5 shows in isolation the other secondary arm.

Transfer of the two other arms 4 and 5, and of the components forming the corresponding outer stability towers 7 to the assembly station and connection to the arms, forming two secondary preassemblies 22 and 23 shown in FIGS. 4 and 5 respectively. In variants (not shown), the outer stability towers 7 are built or assembled onto the corresponding arms, after these arms have been loaded out.

Transfer to storage of the primary assembly 21 and secondary preassemblies 22 and 23, for load-out. The load-out out may be carried out using a relatively short quay area since only the primary preassembly 21 and secondary preassemblies 22 and 23 are to be loaded out. The load-out vessel or lift may be relatively small thus releasing a major constraint on the port requirements and making a worldwide deployment less onerous.

Figure 6:
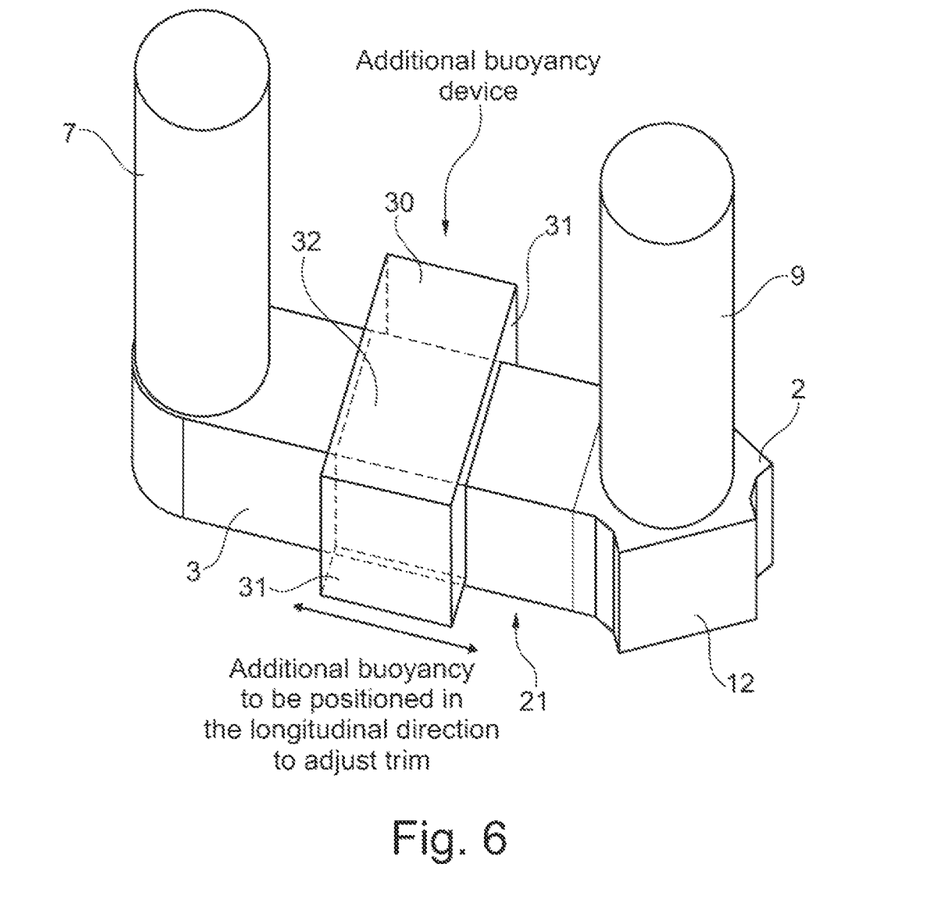
FIG. 6 shows a buoyancy device mounted on a corresponding arm.
Figure 7:
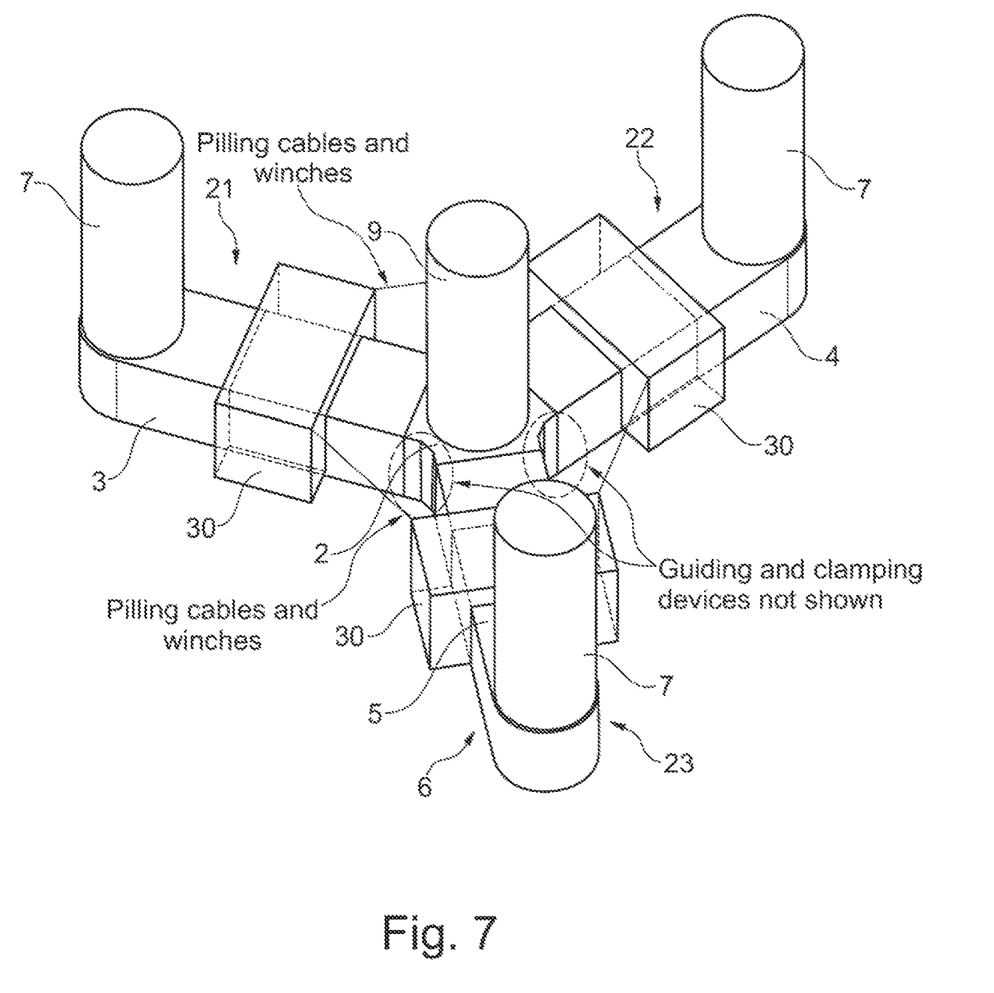
FIG. 7 shows the floating structure equipped with the buoyancy devices after assembly of the arms.

Before being loaded-out the primary preassembly 21 and the secondary preassemblies 22 and 23 are fitted with additional flotation devices 30 as shown in FIG. 6. In a variant, the devices 30 are mounted on the primary assembly and secondary arms offshore.

Figure 8:
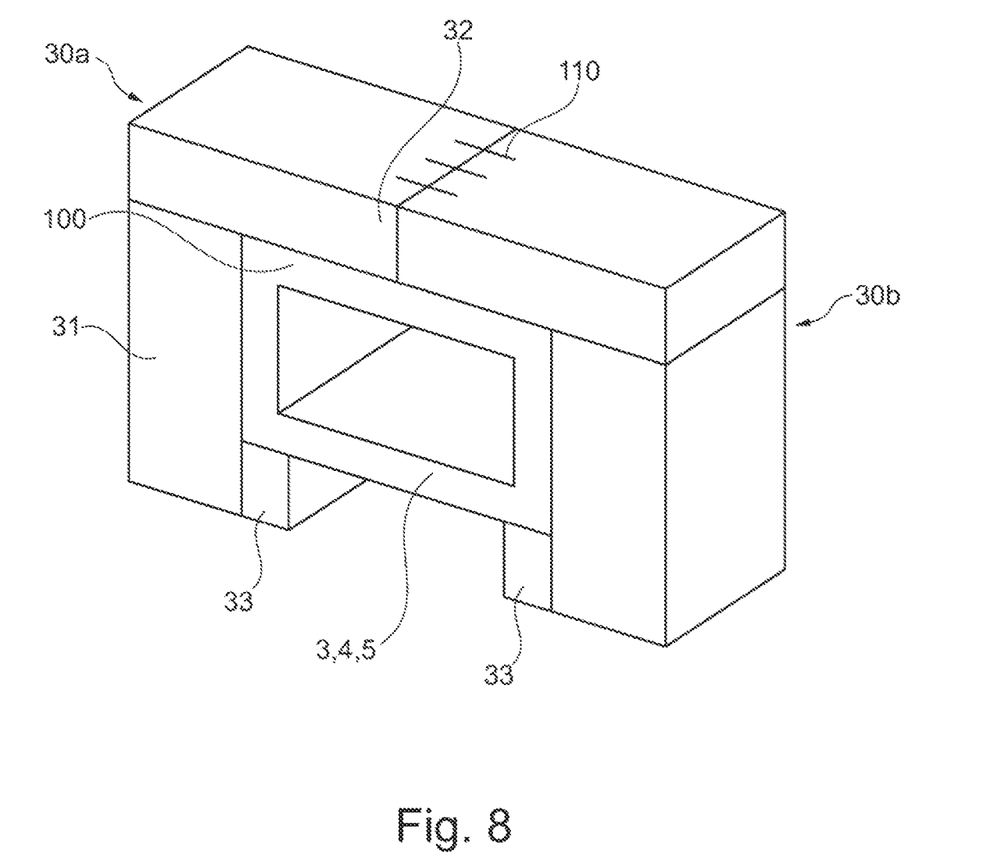
FIG. 8 is a partial and schematic view of a flotation device mounted on a corresponding arm.

Each flotation device 30 may have the structure shown in FIG. 8, having substantially a U-shape in cross section, with two legs 31 extending downward and an upper base 32 resting on the arm. Each leg 31 may be provided with a retractable lower corbel 33, which extends under the arm to retain the device 30 on the arm.

The flotation device 30 may be made in two symmetrical parts 30*a* and 30*b*, connected by a transverse connection system 110 such as bolt/nut system or any other appropriate fixation system. Each part 30*a* or 30*b* may be initially floating independently, and connected over the corresponding concrete top slab arm 100. The upper base 32 may be a steel structure.

In a variant (not shown), the flotation device is made of side stability floaters with eccentricity, connected with floater arms and a central connection piece fastened onto the corresponding concrete arm top slab for example.

Each device 30 extends preferably along the corresponding arm on a distance less than the length of the arm, and its position can be adjusted axially to provide trim.

Figure 10:
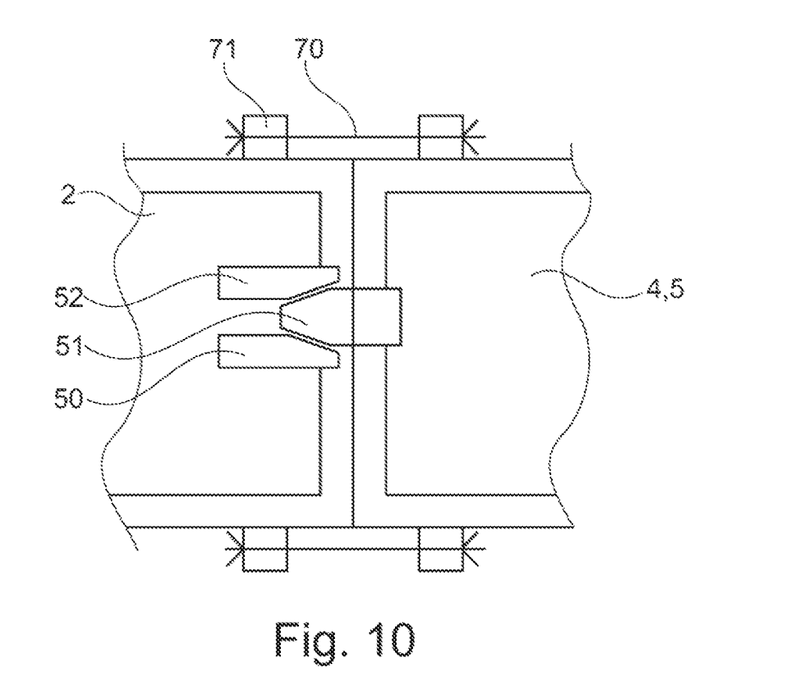
FIG. 10 is a partial and schematic top view of the connector and arm after contact between each other.

The connector 2 and secondary arms 4 and 5 are equipped with a guiding system 50 as shown in FIG. 10, such as a male element 51 and a female element 52 configured for interacting with the male element before the end face of the secondary arm 4 or 5 contacts the corresponding face of the connector 2.

The male element 51 preferably presents a tapered shape and the female element 52 an opening with opposite surfaces converging toward the inside.

Once floated in the water near the quay area, the primary preassembly 21 and the secondary preassemblies 22 and 23 are preferably assembled as follows:

Water ballasting of the primary-preassembly 21 and the secondary pre-assemblies 22 and 23, as well as water ballasting of the flotation devices 30, to adjust free board level as well as trim and heel angles. The arm 3 of the primary preassembly 21 and the arms 4 and 5 of the secondary pre-assemblies 22 and 23 shall be at the same level for assembly.

Figure 9A:
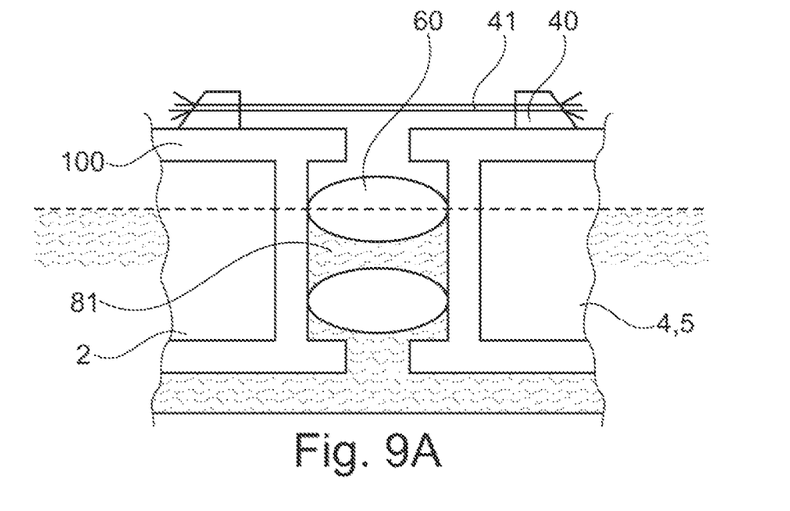
FIGS. 9A and 9B are partial and schematic longitudinal sections of the secondary arm and central connector during the assembly operation, with the waterline shown in dash line.
Figure 9B:
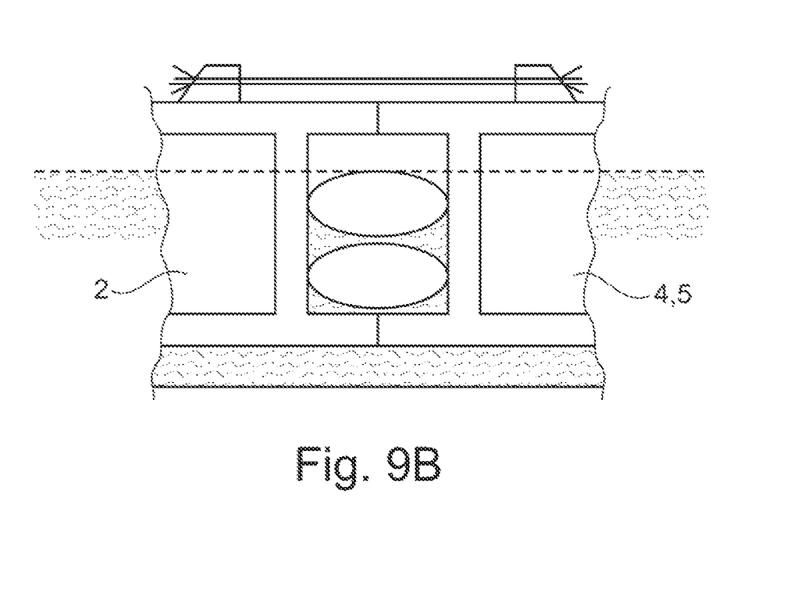

Approaching the central connector 2 of the primary preassembly 21 and the arms 4 and 5 of the secondary pre-assemblies 22 and 23 to each other using a pulling system 40 comprising for example pulling cables 41 as shown in FIGS. 9A and 9B. In the example shown, the pulling system 40 is shown being fixed on the top slab 100 of the connector 2 and secondary arms 4 or 5, but in a variant or additionally the pulling system 40 may be provided on side walls of the connector or secondary arms. During the approach of the connector and arm, the guiding system 50 will center the approaching arm relative to the connector.

Protection fender system 60, such as air-inflatable protection fender or any other suitable device, is provided between the primary pre-assembly 21 and the secondary pre-assemblies 22 and 23 to avoid shocks, as shown in FIGS. 9A and 9B; once the three preassemblies 21, 22 and 23 are in desired position one to each other, this protection fender system 60 is progressively disarmed until concrete-to-concrete contact is obtained between the central connector 2 and the arms 4 and 5, as shown in FIG. 9B.

A clamping system 70, such as an hydraulic clamping system, may be provided as shown in FIG. 10, and activated to keep the primary pre-assembly 21 and the arms 4 and 5 in a fixed position relatively to each other and make the assembled floater fixed. The clamping system 70 may be connected to the connector 2 or arms 4 and 5 through attachments 71 made of concrete.

As shown in FIG. 11, joints 80, such as inflatable joints that are provided between the primary pre-assembly 21 and the other arms 4 and 5 enable sea water present inside the chamber 81 created at the junctions to be pumped out.

Post-tensioning ducts connections 91 in recesses 90 formed during onshore construction are re-instated, and non-shrink mortar 92 is poured in the recesses 90. A concrete joint is thus cast in situ after removal of the water from recesses 90.

Strands are threaded and the tendons made of these strands are post-tensioned.

Ballast compartments are emptied,

The additional flotation devices 30 are disconnected and the complete floater 1 is transferred to quay and docking for remaining works (for example concrete floater compliance tests, installation of mechanical devices, installation of wind turbine mast, nacelle and blades, pre-commissioning).

The floater 1 may then be undocked and towed to a harbor storage station.

The invention claimed is:

1. A method for constructing a wind turbine concrete floater comprising a central connector from which radial arms extend, the central connector carrying a central stability tower, and each of the radial arms carrying an outer stability tower, the method comprising:
prefabricating the radial arms, central connector and at least parts of the central and outer stability towers,
pre-assembling the central connector with one arm to form a primary pre-assembly,
mounting temporary flotation devices onto the radial arms to provide additional buoyancy to the radial arms,
floating the primary preassembly and floating the other arms of the floater,
assembling offshore said primary preassembly with said other arms.

2. The method of claim 1, wherein each temporary flotation device extends along a corresponding arm on a distance less than a length of the arm.

3. The method of claim 1, further comprising adjusting a position of each temporary flotation device axially relative to the arm to make a longitudinal axis of the arm horizontal.

4. The method of claim 1, wherein each temporary flotation device is substantially a U-shape in cross section, with two legs extending downward and an upper base resting on the arm.

5. The method of claim 1, further comprising removing the temporary flotation device after assembly of the other arms to the central connector.

6. The method of claim 1, further comprising assembling on shore each of the radial arms with a corresponding outer stability tower or a part thereof.

7. The method of claim 1, further comprising assembling on shore the central stability tower on a corresponding arm or a part thereof.

8. The method of claim 1, further comprising providing a protection fender system between the primary preassembly and the other arms to avoid shocks between them during an assembly of each of the other arms to the central connector, and wherein the protection fender system is progressively disarmed until concrete-to-concrete contact is obtained between the central connector and each of the other arms.

9. The method of claim 8, wherein the protection fender comprises an inflatable fender.

10. The method of claim 1, further comprising water ballasting the radial arms or the temporary flotation devices to adjust the radial arms at a same level before assembly.

11. The method of claim 1, further comprising approaching the other arms to the central connector using pulling cables and guiding devices.

12. The method of claim 1, further comprising activating a temporary clamping system keeping the other arms in fixed relationship to the central connector while said other arms are assembled to the central connector.

13. The method of claim 12, wherein the step wherein the other arms are assembled to the central connector comprising:
activation of inflatable joints between the central connector and at least one of the other arms to create a chamber at the junction,
pumping water out of the chamber,
reinstating post-tensioning ducts connections in recesses formed during onshore construction,
pouring non-shrink mortar in the recesses,
post-tensioning tendons threaded in said ducts.

14. The method of claim 1, further comprising after completion of an assembly of said other arms to the primary preassembly, installation of a wind turbine mast, nacelle and blades.

* * * * *